Dec. 31, 1929.  W. B. RAYTON  1,741,536
GOGGLES
Filed May 21, 1927

Wilbur B. Rayton.
INVENTOR
BY
his ATTORNEYS

Patented Dec. 31, 1929

1,741,536

UNITED STATES PATENT OFFICE

WILBUR B. RAYTON, OF ROCHESTER, NEW YORK, ASSIGNOR TO BAUSCH & LOMB OPTICAL COMPANY, OF ROCHESTER, NEW YORK, A CORPORATION OF NEW YORK

GOGGLES

Application filed May 21, 1927. Serial No. 193,135.

This invention relates to eye protecting devices and more particularly it has reference to goggles which are adapted to provide eye protection and still afford the wearer a relatively large, unobstructed field of vision so that the device is adapted for use by aviators, motorists, or others who find it necessary to use protectors for the eyes.

Goggle lenses, as such, are not intended to correct the refractive errors of an abnormal eye but are used for the purpose of protecting the eyes from strong wind currents, dust particles or the like, all of which would tend to hinder or impair vision were it not for the use of goggles. Hence the ideal goggle lens is one which has no dioptric power, causes no distortion or displacement of viewed objects, and does not limit or restrict the normal field of vision.

Although lenses having plane parallel surfaces would partially fulfill the requirements of an ideal goggle lens, such lenses greatly restrict the field of vision and make it necessary for the wearer to turn his head in order to glance at or view objects at his sides. Accordingly, curved goggle lenses have been employed and such lenses are designed to extend from the nose of the wearer to a point which is rearward of the outer corner of the eye socket, thereby affording a field of vision which is practically of the same range as when the goggle is removed.

Such requirements as to a large field of vision make it necessary that the goggle lens possess a relatively high degree of curvature so that the lens may be conveniently worn and adapted to properly fit the contour of the face of the wearer. Curved goggle lenses of this type have been made with the optical axis coinciding approximately with the geometrical center of the lens. These lenses are usually made in a relatively long, elliptically-shaped form with both surfaces of the lens having substantially the same curvature, about a 9.0 D. curve for example, so that the lens has practically no dioptric power.

When such a curved elliptically-shaped lens is positioned for use before the eye, one end of the lens is located at the wearer's nose while the other end is located at a point which is rearward of the outer corner of the eye socket. From this it follows that the direct line of sight of the eye must necessarily pass through the nasal end portion of the lens, and this condition leads to troublesome and very annoying prismatic effects which cause apparent displacements of viewed objects. This defect becomes quite a serious matter in the case of aviators and motorists, for example, as clear, accurate and unhampered vision is essential in order to prevent possible accidents by collison.

In the ophthalmic art it has been the practice, for many years, to carefully adjust spectacle lenses before the eyes so that the optical center is directly in front of the pupil of the eye in order to avoid undesired prismatic effects. Accordingly, it has been proposed to provide a curved goggle lens with its optical center located substantially at a point where the direct line of sight pierces the lens when the lens is used before the eye. Notwithstanding prior ophthalmic practice, such a location of the optical center in a curved goggle lens did not eliminate the troublesome prismatic effects because in the position, which such a lens assumes before the eye, the surfaces of the lens are not perpendicular to the line of sight.

One of the most important objects of the present invention is to provide a goggle lens which will afford clear, unhampered vision and have a wide field of view.

Another object is to produce a goggle lens having its optical axis located near one edge in such a manner that displacements of viewed objects will be eliminated at the line of sight when the lens is used before the eye.

Another object is to provide a curved goggle lens wherein the optical axis is spaced from and substantially parallel to the direct line of sight of the wearer in order that prismatic effects may be reduced to a negligible amount.

Other objects and advantages reside in certain novel features of construction, arrangement and combination of parts, which will hereinafter be more fully described and pointed out in the appended claims.

Referring to the drawings.

Figure 5:
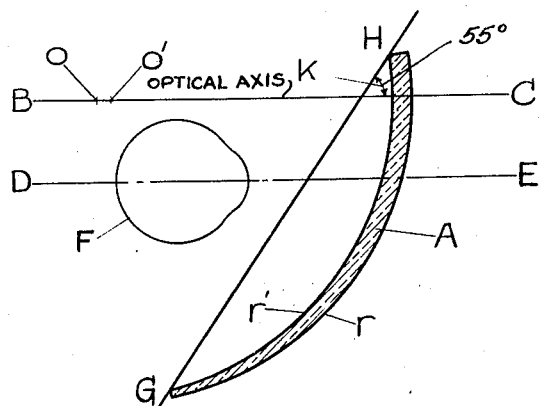
Fig. 5 is a schematic diagram showing my improved lens positioned for use before the right eye.

As shown on the drawings, a preferred embodiment of my improved goggle lens A is curved or meniscus-shaped and may be made in a relatively long elliptical or oval form. The optical axis BC, passing through the two centers of curvature O, O', pierces the lens A adjacent its thick edge, as shown in Fig. 5. The lens A is shown positioned before the right eye F with the thick edge of the lens located at the nasal region and the thinner edge located at a point which is rearward of the outer corner of the eye socket. The lens is located before the eye so that the optical axis BC is substantially parallel to the direct line of sight DE of the eye F. In one embodiment of my invention, the radii of curvature of the two surfaces $r$ and $r'$ are 58.90 mm. and 58.07 mm., respectively, and the thickness of the lens is 2.4 mm. at the point where it is pierced by the optical axis. With these dimensions and curvatures, an imaginary line or chord GH connecting the ends of the lens will make an angle K with the optical axis which is approximately 55 degrees in magnitude. It is to be understood that I do not intend to limit my improved lens to these dimensions, as it is obvious that these values may be altered without departing from the spirit of my invention.

When my improved lens is thus used before the eye with the optical axis of the lens substantially parallel with the line of sight, the difficulties of apparent displacement of viewed objects, due to prismatic effects, are eliminated at the line of sight. Although the diagram of Fig. 5 shows my lens as used before the right eye only, an identical lens is also used before the left eye, arranged in a corresponding manner with the thick edge of the lens at the nasal region of the wearer, the two lenses being mounted in a suitable frame.

Figure 1:
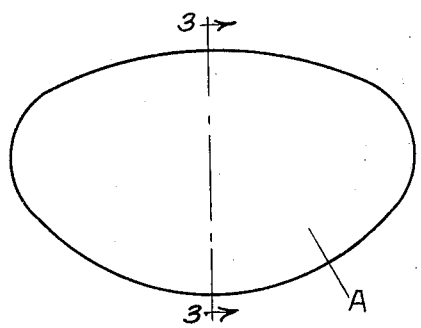
Fig. 1 shows a front view of my goggle lens.
Figure 2:
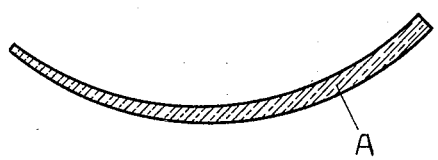
Fig. 2 shows a central horizontal sectional view of the lens of Fig. 1.
Figures 3, 4:
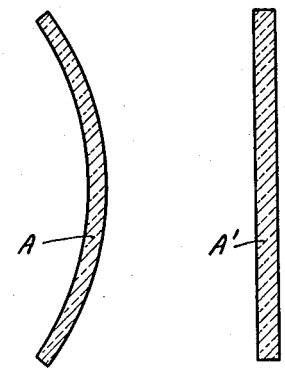
Fig. 3 shows a central vertical sectional view of the lens taken on line 3—3 of Fig. 1.
Fig. 4 shows a central vertical sectional view of a modified form of my lens.

It is also to be understood that my invention is equally applicable to both spherical and cylindrical types of lenses. Thus Fig. 3 shows a vertical sectional view of my lens in the spherical form and Fig. 4 shows a vertical sectional view of a cylindrical lens A' embodying my invention. The horizontal sectional view, shown in Fig. 2, will be the same for both spherical and cylindrical lenses.

From the foregoing, it is apparent that I am able to attain the objects of my invention and provide a goggle lens which will have a wide field of view and afford clear, accurate and unhampered vision without the difficulties which have hitherto been experienced. It is to be understood that the specification and drawings are to be interpreted as illustrative only and not in any limiting sense.

I claim:

1. A curved goggle lens which is designed for use in a definite position before the eye, the direct line of sight of the eye being spaced from and substantially parallel to the optical axis of the lens when the lens is used before the eye, said optical axis passing through the lens at a point which is between the direct line of sight and the nasal edge of the lens.

2. A curved goggle lens which is designed for use in a definite position before the eye and adapted to extend from the nose of the wearer to a point rearward of the outer corner of the eye socket, the nasal end of said lens being thicker than the temporal end, the optical axis of said lens being adjacent the nasal end, said axis being substantially parallel with the direct line of sight.

3. A curved goggle lens which is designed for use in a definite position before the eye, the curvature of the two surfaces of the lens being substantially equal so that the lens has substantially zero power along its optical axis, said axis being substantially parallel with the direct line of sight when the lens is used before the eye, one end of said lens being thicker than the other end, the optical axis of said lens being adjacent the thicker end.

4. A goggle lens comprising a relatively long, curved piece of glass which is designed for use in a definite position before the eye and adapted to extend from the nose of the wearer to a point rearward of the outer corner of the eye socket, the chord connecting the two ends of said lens making an angle with its optical axis which is greater than 45 degrees and less than 70 degrees in magnitude, the optical axis of said lens being substantially parallel with the direct line of sight when the lens is used before the eye, said optical axis piercing the lens at a point which is between the nasal edge and the direct line of sight.

5. A goggle lens comprising a relatively long, curved piece of glass which is designed for use in a definite position before the eye and adapted to extend from the nose of the wearer to a point rearward of the outer corner of the eye socket, the chord connecting the two ends of said lens making an angle with its optical axis which is greater than 45 degrees and less than 70 degrees in magnitude, the optical axis being substantially parallel with the direct line of sight when the lens is used before the eye, said axis piercing the lens at a point between the nasal edge and the direct line of sight, the curvature of the surfaces of said lens being substantially equal so that the lens has substantially zero power along its optical axis.

6. A curved goggle lens which is adapted to extend from the nose of the wearer to a point rearwardly of the outer corner of the eye socket, the nasal end of said lens being thicker than its temporal end, the optical axis of said lens passing through a point adjacent the nasal end, the chord connecting the two ends of said lens forming an angle with said optical axis which is substantially 55 degrees in magnitude.

WILBUR B. RAYTON.